(12) United States Patent
Delubac

(10) Patent No.: US 11,781,959 B2
(45) Date of Patent: Oct. 10, 2023

(54) METHODS AND SYSTEMS FOR SAMPLE EXTRACTION

(71) Applicant: Freenome Holdings, Inc., South San Francisco, CA (US)

(72) Inventor: Daniel Delubac, San Francisco, CA (US)

(73) Assignee: FREENOME HOLDINGS, INC., South San Francisco, CA (US)

(*) Notice: Subject to any disclaimer, the term of this patent is extended or adjusted under 35 U.S.C. 154(b) by 783 days.

(21) Appl. No.: 16/827,439

(22) Filed: Mar. 23, 2020

(65) Prior Publication Data

US 2020/0232894 A1 Jul. 23, 2020

Related U.S. Application Data

(63) Continuation of application No. PCT/US2018/052209, filed on Sep. 21, 2018.

(60) Provisional application No. 62/563,000, filed on Sep. 25, 2017.

(51) Int. Cl.
| | |
|---|---|
| *G01N 11/08* | (2006.01) |
| *G01N 35/10* | (2006.01) |
| *B01L 3/02* | (2006.01) |
| *G01F 1/36* | (2006.01) |

(52) U.S. Cl.
CPC ............ *G01N 11/08* (2013.01); *B01L 3/0237* (2013.01); *B01L 3/0293* (2013.01); *G01F 1/363* (2013.01); *G01N 35/1016* (2013.01); *B01L 3/0279* (2013.01); *B01L 2200/143* (2013.01); *B01L 2300/0663* (2013.01); *B01L 2400/0478* (2013.01); *B01L 2400/0487* (2013.01); *G01N 2035/1062* (2013.01)

(58) Field of Classification Search
None
See application file for complete search history.

(56) References Cited

U.S. PATENT DOCUMENTS

| | | | |
|---|---|---|---|
| 3,938,369 A | * | 2/1976 | de Bok .................. G05D 24/02 137/87.04 |
| 4,905,503 A | * | 3/1990 | Langrick .................. B41J 2/195 73/54.06 |
| 4,988,617 A | | 1/1991 | Landegren et al. |
| 5,452,619 A | * | 9/1995 | Kawanabe ......... G01N 35/1016 73/863 |
| 6,582,938 B1 | | 6/2003 | Su et al. |
| 6,787,308 B2 | | 9/2004 | Balasubramanian et al. |
| 6,833,246 B2 | | 12/2004 | Balasubramanian |
| 6,897,023 B2 | | 5/2005 | Fu et al. |

(Continued)

FOREIGN PATENT DOCUMENTS

| | | |
|---|---|---|
| DE | 19735931 A1 | 2/1999 |
| DE | 10149786 A1 | 7/2003 |

(Continued)

OTHER PUBLICATIONS

Ananthakrishnan et al. Epidemiology and risk factors for IBD. Nat Rev Gastroenterol Hepatol 12(4):205-17 (2015).

(Continued)

*Primary Examiner* — Brian R Gordon
(74) *Attorney, Agent, or Firm* — Wilson Sonsini Goodrich & Rosati

(57) ABSTRACT

The present disclosure provides methods and devices for sample extraction.

10 Claims, 5 Drawing Sheets

(56) References Cited

U.S. PATENT DOCUMENTS

| | | | |
|---|---|---|---|
| 6,969,488 B2 | 11/2005 | Bridgham et al. | |
| 7,727,720 B2 | 6/2010 | Dhallan | |
| 7,754,429 B2 | 7/2010 | Rigatti et al. | |
| 8,168,385 B2 | 5/2012 | Brenner | |
| 8,318,433 B2 | 11/2012 | Brenner | |
| 9,035,035 B2 | 5/2015 | Cherkasov et al. | |
| 9,040,239 B1 | 5/2015 | Zheng et al. | |
| 9,080,210 B2 | 7/2015 | Van Eijk et al. | |
| 9,447,452 B2 | 9/2016 | Rao et al. | |
| 10,337,053 B2 | 7/2019 | Rao et al. | |
| 10,436,694 B2* | 10/2019 | Baek | G01N 11/08 |
| 10,443,091 B2 | 10/2019 | Rao et al. | |
| 10,533,213 B2 | 1/2020 | Rao et al. | |
| 10,731,204 B2 | 8/2020 | Rao et al. | |
| 10,767,216 B2 | 9/2020 | Rao et al. | |
| 10,774,373 B2 | 9/2020 | Rao et al. | |
| 10,978,175 B2 | 4/2021 | Van Eijk et al. | |
| 11,072,818 B2 | 7/2021 | Rao et al. | |
| 11,208,683 B2 | 12/2021 | Rao et al. | |
| 11,378,505 B1* | 7/2022 | Tseng | G01N 11/04 |
| 11,514,289 B1 | 11/2022 | Otte et al. | |
| 2002/0012930 A1 | 1/2002 | Rothberg et al. | |
| 2002/0148282 A1 | 10/2002 | Hajduk et al. | |
| 2003/0022207 A1 | 1/2003 | Balasubramanian et al. | |
| 2003/0041652 A1* | 3/2003 | Spaid | G01N 27/44791 73/54.05 |
| 2003/0044781 A1 | 3/2003 | Korlach et al. | |
| 2003/0058629 A1 | 3/2003 | Hirai et al. | |
| 2003/0064398 A1 | 4/2003 | Barnes | |
| 2003/0100102 A1 | 5/2003 | Rothberg et al. | |
| 2003/0148344 A1 | 8/2003 | Rothberg et al. | |
| 2003/0182991 A1* | 10/2003 | Spaid | B01L 3/5027 73/54.04 |
| 2004/0106130 A1 | 6/2004 | Besemer et al. | |
| 2004/0181344 A1 | 9/2004 | Stephanopoulos et al. | |
| 2004/0248161 A1 | 12/2004 | Rothberg et al. | |
| 2005/0079510 A1 | 4/2005 | Berka et al. | |
| 2005/0100932 A1 | 5/2005 | Lapidus et al. | |
| 2005/0124022 A1 | 6/2005 | Srinivasan et al. | |
| 2006/0012784 A1 | 1/2006 | Ulmer | |
| 2006/0012793 A1 | 1/2006 | Harris | |
| 2006/0024678 A1 | 2/2006 | Buzby | |
| 2006/0024711 A1 | 2/2006 | Lapidus et al. | |
| 2006/0078909 A1 | 4/2006 | Srinivasan et al. | |
| 2006/0078937 A1 | 4/2006 | Korlach et al. | |
| 2006/0147922 A1 | 7/2006 | Watts et al. | |
| 2006/0211132 A1* | 9/2006 | Miledi | B01L 3/0265 436/180 |
| 2007/0020763 A1* | 1/2007 | Ingenhoven | G01N 1/14 436/43 |
| 2008/0213792 A1 | 9/2008 | Kramer | |
| 2008/0227663 A1* | 9/2008 | Tisone | C12M 41/00 506/40 |
| 2009/0216465 A1 | 8/2009 | Millet et al. | |
| 2012/0096929 A1* | 4/2012 | Baek | G01N 11/08 73/54.14 |
| 2013/0045498 A1* | 2/2013 | Abel | G01N 11/04 435/23 |
| 2013/0224740 A1 | 8/2013 | Thierry et al. | |
| 2014/0171339 A1 | 6/2014 | Keku et al. | |
| 2015/0011401 A1 | 1/2015 | Davicioni et al. | |
| 2015/0213193 A1 | 7/2015 | Apte et al. | |
| 2015/0329891 A1 | 11/2015 | Tan et al. | |
| 2016/0153054 A1 | 6/2016 | Feng et al. | |
| 2017/0030818 A1 | 2/2017 | Baek | |
| 2017/0274641 A1* | 9/2017 | Pagnon | G01N 11/08 |
| 2017/0277843 A1 | 9/2017 | Apte et al. | |
| 2017/0357763 A1 | 12/2017 | Apte et al. | |
| 2019/0011474 A1* | 1/2019 | Ewoniuk | G01F 22/00 |
| 2019/0301986 A1* | 10/2019 | Olechno | C12N 15/1003 |
| 2019/0358626 A1* | 11/2019 | Romer | G01F 11/029 |
| 2021/0010076 A1 | 1/2021 | Delubac et al. | |
| 2021/0057046 A1 | 2/2021 | Liu et al. | |
| 2021/0121870 A1* | 4/2021 | Hill | B01L 3/0227 |
| 2021/0121871 A1* | 4/2021 | Tourniaire | B01L 3/0268 |
| 2021/0121872 A1* | 4/2021 | McNaul | B01L 3/0275 |
| 2021/0174958 A1 | 6/2021 | Drake et al. | |
| 2021/0210205 A1 | 7/2021 | Drake et al. | |
| 2021/0230684 A1 | 7/2021 | Ariazi et al. | |
| 2021/0272653 A1 | 9/2021 | Ulz et al. | |
| 2022/0283069 A1* | 9/2022 | Mameda | G01N 11/14 |
| 2022/0357258 A1* | 11/2022 | Baek | G01N 11/08 |
| 2022/0381799 A1* | 12/2022 | Noda | G01N 35/10 |
| 2023/0045577 A1* | 2/2023 | Mizutani | B01L 3/0275 |

FOREIGN PATENT DOCUMENTS

| | | |
|---|---|---|
| DE | 10214395 A1 | 10/2003 |
| DE | 10356837 A1 | 6/2005 |
| DE | 102004009704 A1 | 9/2005 |
| DE | 102004025744 A1 | 12/2005 |
| DE | 102004025745 A1 | 12/2005 |
| DE | 102004025746 A1 | 12/2005 |
| DE | 102004025694 A1 | 2/2006 |
| DE | 102004025695 A1 | 2/2006 |
| DE | 102004025696 A1 | 2/2006 |
| WO | WO-9634269 A1 | 10/1996 |
| WO | WO-02088382 A2 | 11/2002 |
| WO | WO-03020968 A2 | 3/2003 |
| WO | WO-03031947 A2 | 4/2003 |
| WO | WO-2005044836 A2 | 5/2005 |
| WO | WO-2006005655 A1 | 1/2006 |
| WO | WO-2006005657 A1 | 1/2006 |
| WO | WO-2015070086 A1 | 5/2015 |
| WO | WO-2016094947 A1 | 6/2016 |
| WO | WO-2018009723 A1 | 1/2018 |
| WO | WO-2019060716 A1 | 3/2019 |
| WO | WO-2019100024 A1 | 5/2019 |
| WO | WO-2019147663 A1 | 8/2019 |
| WO | WO-2019191649 A1 | 10/2019 |
| WO | WO-2020076772 A1 | 4/2020 |
| WO | WO-2020243609 A1 | 12/2020 |
| WO | WO-2021202351 A1 | 10/2021 |
| WO | WO-2021222220 A2 | 11/2021 |
| WO | WO-2022076237 A1 | 4/2022 |
| WO | WO-2022140116 A1 | 6/2022 |
| WO | WO-2022204358 A1 | 9/2022 |
| WO | WO-2022261192 A1 | 12/2022 |
| WO | WO-2023003851 A1 | 1/2023 |

OTHER PUBLICATIONS

Bramsen et al. Molecular-Subtype-Specific Biomarkers Improve Prediction of Prognosis in Colorectal Cancer. Cell Reports 19:1268-1280 (2017).

Bullman. How the Microbiome Impacts Cancer, Immunity, and Response to Therapy. Presentation slides San Francisco Jan. 25, 2020 (10 pgs).

Cleary et al. Detection of low-abundance bacterial strains in metagenomic datasets by eigengenome partitioning. Nat Biotechnol 33(10):1053-60 (2015).

Dadkhah et al. Gut microbiome identifies risk for colorectal polyps. BMJ Open Gastro 6:e000297 (2019).

De Palma et al. The Molecular Hallmarks of the Serrated Pathway in Colorectal Cancer. Cancer 11:1017 (2019).

Ding et al. DectICO: an alignment-free supervised metagenomic classification method based on feature extraction and dynamic selection. BMC Medical Genomics 16:323 (2015).

Ditzler et al. Multi-Layer and Recursive Neural Networks for Metagenomic Classification. IEEE Transactions on Nanobioscience 14(6):608-616 (2015).

Farooqi et al. High Concentration Capture Probes Enhance Massively Parallel Sequencing Assays. Clinical Chemistry 62(7):1032-1034 (2016).

Gopalakrishnan et al. Gut microbiome modulates response to anti-PD-1 immunotherapy in melanoma patients. Science 359(6371):97-103 (2018).

Havel et al. The evolving landscape of biomarkers for checkpoint inhibitor immunotherapy. Nat Rev Cancer 19(3):133-150 (2019).

(56) References Cited

OTHER PUBLICATIONS

Huang et al. Analysis of microbial sequences in plasma cell-free DNA for early-onset breast cancer patients and healthy females. BMC Medical Genomics 11(Suppl 1):16 (2018).
Kowarsky et al. Numerous uncharacterized and highly divergent microbes which colonize humans are revealed by circulating cell-free DNA. PNAS USA 114(36):9623-9628 (2017).
PCT/US2019/014740 International Search Report and Written Opinion dated Apr. 8, 2019.
PCT/US2019/024942 International Search Report and Written Opinion dated Jul. 30, 2019.
Piening et al. Integrative Personal Omics Profiles during Periods of Weight Gain and Loss. Cell Systems 6:1-14 (2018).
Spira et al. Precancer Atlas to Drive Precision Prevention Trials. Cancer Res. 77(7):1510-1541 (2017).
Wang et al. Evaluation of antibody level against Fusobacterium nucleatum in the serological diagnosis of colorectal cancer. Scientific reports 6:33440 (2016).
Zhang et al. Identification of low abundance microbiome in clinical samples using whole genome sequencing. Genome Biology 16:265 (2015).
PCT/US2018/052209 International Search Report and Written Opinion dated Feb. 28, 2019.
PCT/US2018/052209 Invitation to Pay Additional Fees dated Jan. 7, 2019.

\* cited by examiner

METHODS AND SYSTEMS FOR SAMPLE EXTRACTION

CROSS-REFERENCE

The present application claims the benefit of PCT Application No. PCT/US2018/052209, filed Sep. 21, 2018, which claims the benefit of U.S. Provisional Application No. 62/563,000, filed Sep. 25, 2017, each of which is entirely incorporated herein by reference.

BACKGROUND

The process of fractioning whole blood, into its primary components is termed blood fractionation. Blood fractionation is typically achieved, by centrifuging a whole blood sample. Different types of centrifugation may be used in blood fractionation; for example, ultracentrifugation, differential centrifugation, isopycnic centrifugation, density gradient centrifugation, or rate-zonal centrifugation may be employed. Components of blood are: a solution of plasma, which can be further fractionated (i.e. blood plasma fractionation), located in the upper phase; the buffy coat, which is a mixture of leukocytes (white blood cells including neutrophils, lymphocytes, monocytes, eosinophils, and basophils) and platelets, located in the middle phase; and erythrocytes (red blood cells), located in the bottom phase. Other components of blood include exosomes, platelet rich-plasma, serum, albumins, globulins, fibrinogen, prothrombin, ions, gases, waste products, carbohydrates, proteins, electrolytes, hormones, antibodies, vitamins, and fat globules.

Fractionation of blood to recover functional, useful and/or well characterized analytes from primary blood samples is a very critical and required part of at least some modern blood-based, cell-based, or molecular biology-based assays. The recovery of a given fraction is the first step of most assays that rely on further analysis of one of the following blood fractions: serum, plasma, platelet-rich plasma, buffy coat/white blood cells, erythrocytes, platelets, exosomes, circulating tumor cells, etc.

Blood fractionation and blood plasma fractionation methods are used to isolate and manufacture important protein products. For example, plasma fractionation was developed because of a need for blood serum products to treat wounded soldiers. Currently, there are multiple fractionated plasma products in the market such as albumin, alpha-1 proteinase inhibitor, fibrin, fibrinogen, thrombin, immune globulins, coagulation factors, etc. Plasma may also be used in clinical diagnosis due to the abundance of clinical biomarkers present in plasma. Plasma biomarkers may indicate the presence of certain diseases in an individual.

SUMMARY

Current methods of blood fractionation rely on vision-based, blind, chemical, or biochemical approaches that may be often ineffective and laborious. For example, visual-based inspection systems comprise a camera or a laser that uses the optical properties of different blood fractions after they have been mechanically separated, typically through differential or density gradient centrifugation directly within the input tube. These visual-based, approaches may be inefficient in laboratories and in manufacturing and clinical environments as inbound samples coming from clinical centers can be covered in unexpected labels that prevent visual access to the sample.

Furthermore, blind or static aspiration systems may be programmed to function based on default sample volumes that may not be automatically detected. In other words, default parameters may need to be manually optimized for samples containing volumes that are less than the pre-set, default volume. Thus, these samples may leave behind a significant portion of the target fraction to guarantee the purity of the layer recovered in the majority of samples. If process parameters are not properly manually optimized or incoming samples may deviate significantly from the expected properties, the static approach may lead to cross-contamination of different fractions.

In addition, for certain fractions (e.g., white blood cells, platelets, and/or exosomes), chemical, biochemical, or molecular biology techniques may be used to selectively recover some fractions through preferential binding. For example, one of these techniques may comprise magnetic beads functionalized with specific antibodies that bind to specific surface expressed proteins on sub-populations of white blood cells, exosomes, or circulating tumor cells. However, these techniques may be costly and may not meet the demands placed on systems used to manufacture blood- and plasma-derived products (i.e. effective scale-up, highly accurate control systems, etc.). Blood fractionation remains a very challenging, inefficient, and difficult process to automate.

The sample extraction methods, devices, and systems described herein provide for accurate fractionation of liquid and or viscous samples such as, but not limited to, whole blood. This technology allows for the simple, efficient, and fully automated separation of analytes from whole blood and other primary samples; including but not limited to: serum, plasma, platelet-rich plasma, the entire burly coat layer, erythrocytes, platelets, and/or exosomes. The sample extraction methods described herein do not require any chemical or biochemical reagents and do not require any visual monitoring of samples. Moreover, the sample extraction methods described herein automatically adjust to any volume of sample and do not require manual customization of aspiration and/or dispense parameters.

Disclosed herein, in some aspects, are methods for sample extraction, comprising: (a) activating a sample extraction device comprising: (i) a pipette comprising an opening in fluid communication with a reservoir through at least one channel, and (ii) at least one sensor in sensing communication with the channel or reservoir, wherein the sensor outputs one or more signals indicative of viscosity in the channel or the reservoir; (b) directing the pipette into a container comprising a plurality of samples, wherein the plurality of samples comprises a first sample and a second sample, wherein the first sample and the second sample have different viscosities; (c) subjecting the first sample to flow from the container through the opening to the reservoir upon application of a pressure drop, wherein the first sample is subjected to flow while the sensor outputs the one or more signals indicative of the viscosity in the channel or the reservoir; (d) detecting a change in the viscosity, which change is indicative of the second sample flowing from the container through the opening towards the reservoir; and (e) upon detecting the change in (d), terminating application of the pressure drop, thereby reducing a flow rate of the second sample from the container through the opening towards the reservoir. In some aspects, the sample extraction device comprises a fluid flow unit in fluid communication with the channel, wherein the fluid flow unit supplies the pressure drop. In some aspects, the fluid flow unit comprises a pump. In some aspects, the pump is a piston pump, a vacuum pump, an air pump, a diaphragm pump, a gear pump, a peristaltic pump, piezoelectric micropump, an electrostatic micropump, a thermo-pneumatic micropump, a pneumatic micropump, or a magnetic micropump. In some aspects, the pump is a micropump. In some aspects, the pump is operatively coupled to the pipette. In some aspects, the sample extraction device comprises a motion platform. In some aspects, the motion platform is operatively connected to the pipette. In some aspects, the motion platform moves the pipette in an x-direction, a y-direction, and a z-direction. In some aspects, the motion platform is a robotic motion platform, a robotic arm, or a gantry. In some aspects, the pipette comprises a pipette tip. In some aspects, the sample extraction device comprises a pipette tip ejector that ejects a pipette tip coupled to the pipette. In some aspects, the sample extraction device comprises a barcode reader that identifies and tracks the container. In some aspects, the pipette is dimensioned to extract a fluid volume of up to 10 mL. In some aspects, the container comprises a label or a barcode. In some aspects, (b) comprises scanning the label or barcode on the container prior to directing the pipette into the container. In some aspects, (e) comprises ejecting a small volume of the second sample after terminating application of the pressure drop. In some aspects, (e) comprises terminating the flow rate of the second sample. In some aspects, the first sample is directed from the reservoir to a waste container after the termination of the flow rate of the second sample. In some aspects, the first sample is directed from the reservoir to an additional container after the termination of the flow rate of the second sample. In some aspects. (e) comprises ejecting the pipette tip and loading a new pipette tip after terminating the flow rate of the second sample. In some aspects, the pipette comprising the new pipette tip is directed to the container after terminating the flow rate of the second sample. In some aspects, the pipette comprising the new pipette tip is directed to an additional container after terminating the flow rate of the second sample. In some aspects, the pressure drop is not sufficient to subject the second sample to flow from the container through the opening, to the reservoir. In some aspects, the change in the viscosity is detected with reference to a threshold viscosity, in some aspects, the threshold viscosity ranges between about 0.1 cP and about 20 cP. In some aspects, the change in the viscosity is detected upon a change in flow rate. v In some aspects, a decrease inflow rate corresponds to an increase in the viscosity. In some aspects, the first sample and the second sample are derived front blood. In some aspects, the blood is whole blood. In some aspects, the whole blood is subjected to ultracentrifugation, differential centrifugation, isopycnic centrifugation, density gradient centrifugation, or rate-zonal centrifugation prior to (b). In some aspects, the first sample includes plasma and the second sample includes a buffy coat. In some aspects, the first sample includes blood fractions, serum, plasma, platelet-rich plasma, a buffy coat layer, erythrocytes, platelets, exosomes, or circulating tumor cells. In some aspects, the second sample includes blood fractions, serum, plasma, platelet-rich plasma, a huffy coat layer, erythrocytes, platelets, exosomes, or circulating tumor cells. In some aspects, the plurality of samples comprises a third sample. In some aspects, the third sample includes blood fractions, serum, plasma, platelet-rich plasma, a huffy coat layer, erythrocytes, platelets, exosomes, or circulating tumor cells. In some aspects, the sensor is a pressure sensor or a flow rate sensor. In some aspects, the signal indicative of viscosity output by the flow rate sensor is a change in flow rate. In some aspects, the sample extraction device comprises a plurality of pipettes. In some aspects, the plurality of pipettes is individually addressable. In some aspects, the plurality of pipettes is individually controlled and individually actuated. In some aspects, the method comprises activating an array comprising one or more sample extraction devices. In some aspects, the array is mounted on a single platform. In some aspects, the one or more sample extraction devices of the array are individually controlled and individually actuated. In some aspects, the one or more sample extraction devices of the array work in parallel or are synchronized. In some aspects, the array comprises up to 384 sample extraction devices. In some aspects, the array is linear, two-dimensional, or three-dimensional. In some aspects, (b)-(e) are performed in the absence of visual inspection of the first sample or the second sample. In some aspects, the visual inspection comprises use of a laser-based system or camera-based system. In some aspects, (b)-(e) are performed in the absence of a measurement of a height or volume of the first sample or the second sample contained in the container. In some aspects, (b)-(e) are performed in the absence of a chemical assay, a biochemical assay, a molecular biology assay performed on the first sample and the second sample. In some aspects, (b)-(e) are performed in the absence of a density centrifugation medium.

Disclosed herein, in certain aspects, are sample extraction devices, comprising: a container configured to contain a plurality of samples comprising a first sample and a second sample, wherein the first sample and the second sample have different viscosities; a pipette comprising an opening in fluid communication with a reservoir through at least one channel; a sensor in sensing communication with the channel or reservoir, wherein the sensor outputs one or more signals indicative of viscosity in the channel or the reservoir, a fluid flow unit in fluid communication with the channel, wherein the fluid flow unit supplies a pressure drop; an actuator that is configured to direct the pipette into the container; and one or more computer processors operatively coupled to the sensor and the fluid flow unit, wherein the one or more computer processors are individually or collectively programmed to: (i) direct the actuator to direct the pipette into the container comprising the plurality of samples; (ii) direct the fluid flow unit to subject the first sample to flow from the container through the opening to the reservoir upon application of a pressure drop, wherein the first sample is subjected to flow while the sensor outputs the one or more signals indicative of the viscosity in the channel or the reservoir; (iii) use the sensor to detect a change in the viscosity, which change is indicative of the second sample flowing from the container through the opening towards the reservoir; and (iv) upon detecting the change in (iii), direct the fluid flow unit to terminate application of the pressure drop, thereby reducing a flow rate of the second sample from the container through the opening towards the reservoir. In some aspects, the sample extraction device comprises a motion platform operatively connected to the pipette, wherein the motion platform displaces the pipette in an x-direction a y-direction, and a z-direction. In some aspects, the motion platform is a robotic motion platform, a robotic arm, or a gantry. In some aspects, the pipette comprises a pipette tip. In some aspects, the sample extraction device comprises a pipette tip ejector that ejects the pipette tip coupled to the pipette. In some aspects, the pipette is dimensioned to extract a fluid volume of up to 10 mL. In some aspects, the container or an additional container comprises a label or a barcode. In some aspects, the sample extraction device comprises a barcode reader that identities and tracks the container or the additional container. In some aspects, the sample extraction device comprises a plurality of pipettes. In some aspects, the plurality of pipettes is individually addressable. In some aspects, the plurality of pipettes is individually controlled and individually actuated. In some aspects, the fluid flow unit comprises a pump. In some aspects, the pump is a piston pump, a vacuum pump, an air pump, a diaphragm pump, a gear pump, a peristaltic pump, piezoelectric micropump, an electrostatic micropump, a thereto-pneumatic micropump, a pneumatic micropump, or a magnetic micropump. In some aspects, the pump is a micropump. In some aspects, the pump is operatively coupled to the pipette or the plurality of pipettes. In some aspects, the one or more computer processors are individually or collectively programmed to eject a small volume of the second sample after terminating application of the pressure drop. In some aspects, the one or more computer processors are individually or collectively programmed to terminate the flow rate of the second sample. In some aspects, the one or more computer processors are individually or collectively programmed to direct the first sample front the reservoir to a waste container after termination of the flow rate of the second sample. In some aspects, the one or more computer processors are individually or collectively programmed to direct the first sample from the reservoir to the additional container after termination of the flow rate of the second sample. In some aspects, the one or more computer processors are individually or collectively programmed to eject the pipette tip and load a new pipette tip after termination of the flow rate of the second sample. In some aspects, the one or more computer processors are individually or collectively programmed to direct the pipette comprising the new pipette tip to the container after termination of the flow rate of the second sample. In some aspects, the one or more computer processors are individually or collectively programmed to direct the pipette comprising the new pipette tip to a new container after terminating the flow rate of the second sample.

Disclosed herein, in certain aspects, are non-transitory computer-readable media comprising machine-executable code that, upon execution by one or more computer processors, implements a method for sample extraction, the method comprising: (a) activating a sample extraction device comprising (i) a pipette comprising an opening in fluid communication with a reservoir through at least one channel, and (ii) a sensor in sensing communication with the channel or reservoir, wherein the sensor outputs one or more signals indicative of viscosity in the channel or the reservoir; (b) directing the pipette into a container comprising a plurality of samples, wherein the plurality of samples comprises a first sample and a second sample, wherein the first sample and the second sample have different viscosities; (c) subjecting the first sample to flow from the container through the opening to the reservoir upon application of a pressure drop, wherein the first sample is subjected to flow while the sensor outputs the one of more signals indicative of the viscosity in the channel or the reservoir; (d) detecting a change in the viscosity, which change is indicative of the second sample flowing from the container through the opening towards the reservoir, and (e) upon detecting the change in (d), terminating application of the pressure drop, thereby reducing a flow rate of the second sample from the container through the opening towards the reservoir. In some aspects, the sample extraction device comprises a fluid flow unit in fluid communication with the channel, wherein the fluid flow unit supplies the pressure drop. In some aspects, the fluid flow unit comprises a pump. In some aspects, the pump is a piston pump, a vacuum pump, an air pump, a diaphragm pump, a gear pump, a peristaltic pump, piezoelectric micropump, an electrostatic micropump, a thermo-pneumatic micropump, a pneumatic micropump, or a magnetic micropump. In some aspects, the pump is operatively coupled to the pipette. In some aspects, the pump is a micropump. In some aspects, the sample extraction device comprises a motion platform. In some aspects, the motion platform is operatively connected to the pipette. In some aspects, the motion platform moves the pipette in an x-direction, in a y-direction, and in a z-direction. In some aspects, the motion platform is a robotic motion platform, a robotic arm, or a gantry. In some aspects, the pipette comprises a pipette tip. In some aspects, the sample extraction device comprises a pipette tip ejector that ejects a pipette tip coupled to the pipette. In some aspects, the sample extraction device comprises a barcode reader that identifies and tracks the container. In some aspects, the pipette is dimensioned to extract a fluid volume of up to 10 mL. In some aspects, the container or an additional container comprises a label or a barcode. In some aspects, (b) comprises scanning the label or barcode on the container prior to directing the pipette into the container. In some aspects, (e) comprises ejecting a small volume of the second sample after terminating application of the pressure drop. In some aspects, (c) comprises terminating the flow rate of the second sample. In some aspects, the first sample is directed from the reservoir to a waste container after the termination of the flow rate of the second sample. In some aspects, the first sample is directed from the reservoir to the additional container after the termination of the flow rate of the second sample. In some aspects, (e) comprises ejecting the pipette tip and loading a new pipette tip after terminating the flow rate of the second sample. In some aspects, the pipette comprising the new pipette tip is directed to the container after terminating the flow rate of the second sample. In some aspects, the pipette comprising the new pipette tip is directed to the additional container after terminating the flow rate of the second sample. In some aspects, the pressure drop is not sufficient to subject the second sample to flow from the container through the opening to the reservoir. In some aspects, the change in the viscosity is detected with reference to a threshold viscosity. In some aspects, the threshold viscosity ranges between about 1 cP and about 5 cP. In some aspects, the change in the viscosity is detected upon a change in flow rate. In some aspects, a decrease inflow rate corresponds to an increase in the viscosity. In some aspects, the first sample and the second sample are derived from blood. In some aspects, the blood is whole blood. In some aspects, the whole blood is subjected to density gradient centrifugation prior to (b). In some aspects, the first sample includes plasma and the second sample includes a buff, coat. In some aspects, the first sample includes serum, plasma, platelet-rich plasma, a buffy coat layer, erythrocytes, platelets, exosomes, or circulating tumor cells. In some aspects, the second sample includes serum, plasma, platelet-rich plasma, a buffy coat layer, erythrocytes, platelets, exosomes, or circulating tumor cells. In some aspects, the sensor is a pressure sensor or a flow rate sensor. In some aspects, the signal indicative of viscosity output by the flow rate sensor is a change in flow rate. In some aspects, the sample extraction device comprises a plurality of pipettes. In some aspects, the plurality of pipettes is individually addressable. In some aspects, the plurality of pipettes is individually controlled and individually actuated. In some aspects, (b)-(e) are performed in the absence of visual inspection of the first sample or the second sample. In some aspects, the visual inspection comprises use of a laser-based system or camera-based system. In some aspects, (b)-(e) are performed in the absence of a measurement of a height or volume of the first sample or the second sample contained in the container. In some aspects. (b)-(e) are performed in the absence of chemical, biochemical, or molecular biology assays performed on the first sample and the second sample.

Disclosed herein, in certain aspects, are methods for sample extraction, comprising: (a) providing a container comprising a first sample and a second sample, and (b) using an extraction device to automatically extract the first sample and at most 5% of a volume of the second sample from the container, wherein the first sample is automatically extracted in the absence of visual inspection by a user. In some aspects, the extraction device extracts at most 1% of the volume of the second sample from the container.

Additional aspects and advantages of the present disclosure will become readily apparent to those skilled in this art from the follow mg detailed description, u herein only illustrative embodiments of lie present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over am such contradictory material.

BRIEF DESCRIPTION OF THE DRAWINGS

The novel features of the invention are set forth with particularity in the appended claims. A better understanding of the features and advantages of the present invention will be obtained by reference to the following detailed description tint sets forth illustrative embodiments, in which the principles of the invention are utilized, and the accompany mg drawings (also "Figure" and "FIG." herein), of which:

FIG. 1 shows a two-dimensional array of sample extraction devices.

DETAILED DESCRIPTION

Figure 1:
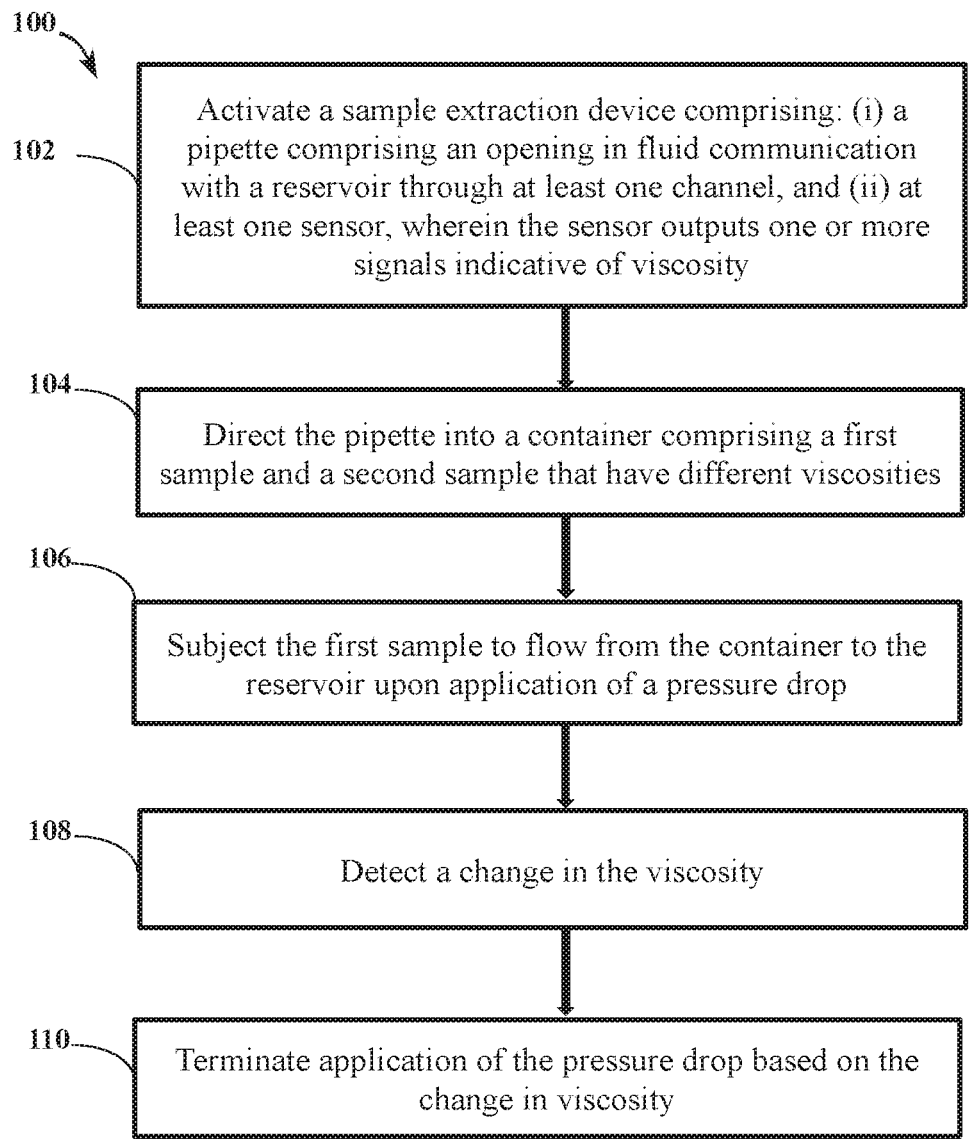
FIG. 1 shows a flow chart illustrating an exemplary method of sample extraction using the devices and software disclosed herein.

While various embodiments of the invention have been shown and described herein, it will be obvious to those skilled in the art that such embodiments are provided by way of example only. Numerous variations, changes, and substitutions may occur to those skilled in the art without departing from the invention, it should be understood that various alternatives to the embodiments of the invention described herein may be employed.

As used herein, the terra "biological sample." refers to any suitable biological or contrived sample (for example, cells in centrifugation media) that comprises a nucleic acid, a protein, or any other biological analyte. The biological sample may be obtained from a subject. A biological sample may be solid matter (e.g., biological tissue) or may be a fluid (e.g., a biological fluid). In general, a biological fluid can include any fluid associated with living organisms. Non-limiting examples of a biological sample include blood (or components of blood—e.g., white blood cells, red blood cells, platelets) obtained, from any anatomical location (e.g., tissue, circulatory system, bone marrow) of a subject, cells obtained from any anatomical location of a subject, skin, heart, lung, kidney, breath, hone marrow, stool, semen, vaginal fluid, interstitial fluids derived from tumorous tissue, breast, pancreas, cerebral spinal fluid, tissue, throat swab, biopsy, placental fluid, amniotic fluid, liver, muscle, smooth muscle, bladder, gall bladder, colon, intestine, brain, cavity fluids, sputum, pus, microbiota, meconium, breast milk, prostate, esophagus, thyroid, serum, saliva, urine, gastric and digestive fluid, tears, ocular fluids, sweat, mucus, earwax, oil, glandular secretions, spinal fluid, hair, fingernails, skin cells, plasma, nasal swab or nasopharyngeal wash, spinal fluid, cord blood, emphatic fluids, and/or other excretions or body tissues.

A biological sample may be obtained from a subject by any means known in the art. Non-limiting examples of means to obtain a biological sample directly from a subject include accessing the circulatory system (e.g., intravenously or intra-arterially via a syringe or other needle), collecting a secreted biological sample (e.g., feces, urine, sputum, saliva, etc.), surgically (e.g., biopsy), swabbing (e.g., buccal swab, oropharyngeal swab), pipetting, and breathing. Moreover, a biological sample may be obtained from any anatomical part of a subject where a desired biological sample is located. Alternatively, a sample can be constructed by mixing biological and non-biological substances.

As used herein, the term "subject," generally refers to an entity or a medium that has testable or detectable biological information. A biological sample can be obtained from a subject. A subject can be a person or individual. A subject can be an invertebrate or a vertebrate, such as, for example, a mammal. Non-limiting examples of mammals include minims, simians, humans, farm animals, sport animals, and pets.

As used herein, the term "pipette," generally refers to an apparatus (e.g., tube) that is usable to transport a sample. A pipette can be a syringe, a motorized syringe, a nozzle, a transfer pipette, an adjustable pipette, a volumetric pipette, an air displacement micropipette, a positive displacement, pipette, a Pasteur pipette, a graduated pipette, a pipetting syringe, a Van Slyke pipette, an Ostwald-Folin pipette, a glass micropipette, a microfluidic pipette, a robotic pipette, an electronic pipette, a motorized pipette, a zeptoliter pipette, a nanoliter pipette, a microliter pipette, or a milliliter pipette.

As used herein, the singular forms "a," "an" and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

The term "about" or "approximately" refers to an amount that is near the stated amount by about 10%, 5%, or 1%, including increments therein. For example, "about" or "approximately" can mean a range including the particular value and ranging from 10% below that particular value and spanning to 10% above that particular value.

Current sample extraction methods and devices rely on visual feedback, manual customization of flow parameters, and/or the use of chemical or biochemical reagents to perform extraction of samples. There is a need for fully automated and accurate sample extraction methods and devices that provide simple and effective sample extraction processes that can be easily scaled-up.

Disclosed herein, in some aspects, are methods for sample extraction, comprising activating a sample extraction device comprising: (i) a pipette comprising an opening in fluid communication with a reservoir through at least one channel, and (ii) at least one sensor in sensing communication with the channel or reservoir, wherein the sensor outputs one or more signals indicative of viscosity in the channel or the reservoir; directing the pipette into a container comprising a plurality of samples, wherein the plurality of samples comprises a first sample and a second sample, wherein the first sample and the second sample have different viscosities; subjecting the first sample to flow from the container through the opening to the reservoir upon application of a pressure drop, wherein the first sample is subjected to flow while the sensor outputs the one or more signals indicative of the viscosity in the channel or the reservoir; detecting a change in the viscosity, which change is indicative of the second sample flowing from the container through the opening towards the reservoir; and upon detecting the change, terminating application of the pressure drop, thereby reducing a flow rate of the second sample from the container through the opening towards the reservoir. In some cases, the sample may be extracted using a combination of the one or more signals from the sensor and other input, such as, for example, visual input or other sensor measurements.

Disclosed herein, in some aspects, are sample extraction devices comprising a container configured to contain a plurality of samples comprising a first sample and a second sample, wherein the first sample and the second sample have different viscosities; a pipette comprising an opening in fluid communication with a reservoir through at least one channel; a sensor in sensing communication with the channel or reservoir, wherein the sensor outputs one or more signals indicative of viscosity in the channel or the reservoir; a fluid flow unit in fluid communication with the channel, wherein the fluid flow unit supplies a pressure drop; an actuator that is configured to direct the pipette into the container; and one or more computer processors operatively coupled to the sensor and the fluid flow unit, wherein the one or more computer processors are individually or collectively programmed to: direct the actuator to direct the pipette into the container comprising the plurality of samples; direct the fluid flow unit to subject the first sample to flow from the container through the opening to the reservoir upon application of a pressure drop, wherein the first sample is subjected to flow while the sensor outputs the one or more signals indicative of the viscosity in the channel or the reservoir; use the sensor to detect a change in the viscosity, which change is indicative of the second sample flowing from the container through the opening towards the reservoir; and upon detecting the change in (iii), direct the fluid flow unit to terminate application of the pressure drop, thereby reducing a flow rate of the second sample from the container through the opening towards the reservoir.

Disclosed herein, in some aspects, are non-transitoty computer-readable media comprising machine-executable code that, upon execution by one or more computer processors, implements a method for sample extraction, the method comprising activating a sample extraction device comprising (i) a pipette comprising an opening in fluid communication with a reservoir through at least one channel, and (ii) a sensor in sensing communication with the channel or reservoir, wherein the sensor outputs one or more signals indicative of viscosity in the channel or the reservoir; directing the pipette into a container comprising a plurality of samples, wherein the plurality of samples comprises a first sample and a second sample, wherein the first sample and the second sample have different viscosities; subjecting the first sample to flow from the container through the opening, to the reservoir upon application of a pressure drop, wherein the first sample is subjected to flow while the sensor outputs the one or more signals indicative of the viscosity in the channel or the reservoir; detecting a change in the viscosity, which change is indicative of the second sample flowing from the container through the opening towards the reservoir; and upon detecting the change in (d), terminating application of the pressure drop, thereby reducing a flow rate of the second sample from the container through the opening towards the reservoir. In some cases, a reduction of the flow rate stops the flow or reverses a direction of flow. For example, some material may be directed back out of the pipette in situations in which the transition is measured by aspiration. A back pressure may also force some material into a tip of the pipette once pumping has been terminated. The direction may be changed (e.g., reversed) to direct fluid into or out of the pipette.

Disclosed herein, in some aspects, are methods for sample extraction, comprising: (a) providing a container comprising a first sample and a second sample, and (b) using an extraction device to automatically extract the first sample and at most 5% of a volume of the second sample from the container, wherein the first sample is automatically extracted in the absence of visual inspection by a user.

Methods for Sample Extraction

In an aspect, the present disclosure provides a method for sample extraction. The sample may include a liquid, a solid, a mixture of the liquid and the solid (e.g., a slurry), or a mixture of two liquids, such as an emulsion. The sample may include semi-solid or gel. The sample may include a plurality of liquids, a plurality of solids, a plurality of liquids and solids, or a liquid and a gas. The sample may include a single phase or multiple phases (e.g., liquid and solid phases). The sample may be a biological sample. The sample may be a fraction of a biological sample. The sample may be a fractionated sample. For example, the fractionated sample may comprise a pellet and a supernatant. The sample may be a fractionated blood sample. The sample also may contain a plurality of different fractions in liquid form. In such embodiments, the fractions can have different viscosities. The sample may be a compound sample comprising a biological sample and an additive. The additive may be centrifugation media; a reagent such as a tissue storage and stabilization reagent; a polymer such as a polysaccharide; a gel; an anti-coagulant such as ethylenediaminetetraacetic acid (EDTA) and citrate; heparin; potassium oxalate; and/or sodium fluoride. The methods for sample extraction, described herein, may be based on the integration of pressure and flow rate measurement devices with flow-generating pumps to reliably recognize the samples (e.g., blood fractions) the system is aspirating from and to detect the interface of different fractionated samples (e.g. blood fractions, following density gradient centrifugation).

The methods for sample extraction, described herein, may use an extraction device to automatically extract a first sample and at most 5% of a volume of a second sample from the container. The first sample may automatically be extracted in the absence of visual inspection by a user. The extraction device may extract at most 1% of the volume of the second sample from the container. The extraction device may extract at most about 0.1%, about 0.2%, about 0.3%, about 0.4%, about 0.5%, about 0.6%, about 0.7%, about 0.8%, about 0.9%, about 1%, about 1.5%, about 2%, about 2.5%, about 3%, about 3.5%, about 4%, about 4.50, about 5%, about 5.50, about 6%, about 6.5%, about 7%, about 7.5%, about 8%, about 8.5%, about 9%, about 9.5%, about 10%, or more of the volume of the second sample from the container. After extraction of the first sample, the extraction device may extract any volume of the second sample from the container. The extraction device can then be reverted to discard the volume extracted from the second sample. The extraction device may discard at least about 1%, about 10%, about 20%, about 30%, about 40%, about 50%, about 60%, about 70%, about 80%, about 90%, about 95% or more of the volume extracted from the second sample. The extraction device may extract and isolate the first sample without contamination from the second sample.

The method may comprise activating a sample extraction device comprising (i) a pipette comprising an opening in fluid communication with a reservoir through at least one channel, and (ii) at least one sensor in sensing communication with the channel or reservoir, wherein the sensor(s) outputs one or more signals indicative of viscosity in the channel or the reservoir. The variability in viscosity of different samples, for example, different blood fractions, may be used to recognize which fraction a given pipette is aspirating from and stop aspirating as soon as a different sample (e.g. blood fraction) is hit. Depending on what sample (e.g., blood fraction) is intended to be recovered, one or more computer processors may be used to control the recovery or discarding of the aspirated sample (e.g. blood fraction). The sensor may detect viscosity, pressure, voltage, surface tension, resistance, and/or a magnetic, field. The sensor may be a pressure sensor or a flow rate sensor. The signal indicative of viscosity output by the flow rate sensor may be a change inflow rate. The viscosity detected by a sensor may be a kinematic viscosity or a dynamic viscosity. Additionally, the sensor(s) may output one or more signals indicative of fluid dynamic parameters. The fluid dynamic parameters may be non-Newtonian fluid dynamic parameters. Non-limiting examples of fluid dynamic parameters include viscosity, shear rate, shear stress, density, specific gravity, relative density, and or shear flow.

Next, the pipette may be directed into a container comprising a plurality of samples. 1 plurality of samples may be fluids, solids, gases, semi-solids, gels, or a combination thereof. The plurality of samples may be individual components of a fractionated sample (e.g., a fractionated blood sample). The plurality of samples may comprise at least a first sample and a second sample. The first sample and the second sample may have different viscosities. The plurality of samples may comprise at least 2, 3, 4, 5, 6, 7, 8, 9, 10, or more samples. The samples may be mixed in a homogeneous solution or separated into various layers or fractions, for example. The sample may be pre-centrifuged whole blood aliquots.

Next, the first sample may be subjected to flow from the container through the opening to the reservoir upon application of a pressure drop (or pressure differential). For example, the sample may be aspirated by the pipette. The pipette may begin aspiration prior to coming in contact with the sample; thus, the pipette may aspirate air prior to aspirating a first sample. The first sample may be subjected to flow while the sensor outputs the one or more signals indicative of the viscosity in the channel or the reservoir.

Next, a change in the viscosity may be detected. The change may be indicative of the second sample flowing from the container through the opening towards the reservoir. For example, the first jump in viscosity (measured as a decrease in flow rate at a given applied pressure), may be attributed to a first sample (e.g., a first fraction of separated blood), and any further change in viscosity can be attributed to the next expected sample (e.g. next layer of fractionated blood). An expectation of viscosity may be learned from measuring the pressure and flow rates from analytes of interest and used in operations to verify a given sample is of the right type.

Next, upon detecting the change, application of the pressure drop may be terminated. This may reduce (e.g., stop) a flow rate of the second sample from the container through the opening towards the reservoir. For example, once an entire sample or fractionated layer has been aspirated, a pump may be reverted to discard any material that may have been aspirated from a layer below the one of interested. The aspirated layer may then be dispensed in a new, clean container for recovery and further processing, or dispensed in a waste container for elimination.

Activation of a sample extraction device may involve supplying power to various units of the sample extraction device. For example, power may be supplied to a pipette, a manipulation unit, a pump, or a sensor in order to carry out the sample extraction process. The power may be supplied from a power supply, such as the grid or a battery (e.g., solid state battery).

In some cases, the sample extraction device comprises a fluid flow unit in fluid communication with the channel. The fluid flow unit may supply the pressure drop. The fluid flow unit may comprise a pump or a plurality of pumps. The pump may be operatively coupled to the pipette. For example, the pump is operatively coupled to the pipette through a channel (e.g., tubing). The pump may supply the pressure drop. The pump may create suction (i.e. a lower pressure or pressure drop) so that a sample may enter through an inlet (i.e. the distal opening, with respect to the pipette, of the pipette tip). The pump may cause a higher pressure in order to force a sample out (i.e. dispense a sample) through the pipette tip.

In some cases, the sample extraction device comprises a manipulation unit. The manipulation unit may be operatively connected to the pipette. The manipulation unit may move the pipette in an x-direction, a y-direction, and a z-direction. The manipulation unit may move the pipette relative to the container. For instance, the manipulation unit may move the pipette while the container is motionless. As an alternative, the manipulation unit may move the container while the pipette is motionless. As another alternative, the manipulation unit may move both the pipette and the container. The manipulation unit may be powered by an actuator, such as a motor (e.g., step motor) or multi-axis manipulator.

The pipette may comprise a pipette tip. The sample extraction device may comprise a pipette tip ejector that ejects a pipette tip coupled to the pipette. The pipette tip ejector may automatically eject a pipette tip after extraction of a desired sample. The sample extraction device may automatically load a new pipette tip after ejection of a used pipette tip. The pipette may be dimensioned to extract a fluid volume of up to 10 mL. The pipette may be dimensioned to extract a sample of volume of at least about 0.5 µl, 2 µl, 5 µl, 10 µl, 20 µl, 50 µl, 100 µl, 200 µl, 500 µl, 1000 µl, 5000 µl, or more. The sample extraction device may comprise a plurality of pipettes. The plurality of pipettes may be individually addressable. The plurality of pipettes may be individually controlled and individually actuated.

The sample extraction device may comprise a barcode reader that identifies and/or tracks the container. The container may comprise a label or a barcode. The label or barcode on the container may be scanned prior to directing the pipette into the container. As an alternative, the sample extraction device may include a radiofrequency identification (RFID) unit, memory, or chip for identifying and/or tracking the container. The RED, memory, or chip may include a communications interface for permitting communication to or from a reader.

As described elsewhere herein, the flow rate of the second sample may be reduced or stopped after terminating application of the pressure drop. In some cases, the pressure drop is not sufficient to subject the second sample to flow from the container through the opening to the reservoir. A small volume (e.g., a volume of less than about 5 µl, about 10 µl, about 25 µl, about 50 µl, about 100 µl, about 250 µl, about 500 µl, about 1000 µl, or more than about 1000 µL) of the second sample may be ejected after terminating application of the pressure drop. The small volume of the second sample that may be ejected may vary from sample to sample. The small volume of the second sample to be ejected may be calculated based on the lime it takes to identify a change in pressure, flow rate, and/or viscosity. Additionally, the flow rate of the second sample may be terminated after terminating application of the pressure drop. Furthermore, the first sample may be directed from the reservoir to a waste container after the termination of the flow rate of the second sample. The first sample may be also directed from the reservoir to an additional container after the termination of the flow rate of the second sample. The pipette tip may be ejected and a new pipette tip may be loaded after terminating the flow rate of the second sample. The pipette comprising the new pipette tip may be directed to the container after terminating the flow rate of the second sample. The pipette comprising the new pipette tip may be further directed to an additional container after terminating the flow rate of the second sample.

The change in the viscosity may be detected with reference to a threshold viscosity or viscosity level. The change in the viscosity may be detected upon a change in flow rate. A decrease in flow rate tray correspond to an increase in the viscosity.

The threshold viscosity or viscosity level may range between about 0.1 centipoise (cP) to about 40 cP, about 0.2 cP to about 30 cP, or about 0.2 cP to about 20 cP. The threshold viscosity or viscosity level may range between about 0.1 cP to about 40 cP. The threshold viscosity or viscosity level may range between at least about 0.1 cP. The threshold viscosity or viscosity level may range between at most about 40 cP. The threshold viscosity or viscosity level may range between about 0.1 cP to about 0.2 cP, about 0.1 cP to about 0.3 cP, about 0.1 cP to about 0.4 cP, about 0.1 cP to about 0.5 cP, about 0.1 cP to about 1 cP, about 0.1 cP to about 5 cP, about 0.1 cP to about 10 cP, about 0.1 cP to about 15 cP, about 0.1 cP to about 20 cP, about 0.1 cP to about 30 cP, about 0.1 cP to about 40 cP, about 0.2 cP to about 0.3 cP, about 0.2 cP to about 0.4 cP, about 0.2 cP to about 0.5 cP, about 0.2 cP to about 1 cP, about 0.2 cP to about 5 cP, about 0.2 cP to about 10 cP, about 0.2 cP to about 15 cP, about 0.2 cP to about 20 cP, about 0.2 cP to about 30 cP, about 0.2 cP to about 40 cP, about 0.3 cP to about 0.4 cP, about 0.3 cP to about 0.5 cP, about 0.3 cP to about 1 cP, about 0.3 cP to about 5 cP, about 0.3 cP to about 10 cP, about 0.3 cP to about 15 cP, about 0.3 cP to about 20 cP, about 0.3 cP to about 30 cP, about 0.3 cP to about 40 cP, about 0.4 cP to about 0.5 cP, about 0.4 cP to about 1 cP, about 0.4 cP to about 5 cP, about 0.4 cP to about 10 cP, about 0.4 cP to about 5 cP, about 0.4 cP to about 20 cP, about 0.4 cP to about 30 cP, about 0.4 cP to about 40 cP, about 0.5 cP to about 1 cP, about 0.5 cP to about 5 cP, about 0.5 cP to about 10 cP, about 0.5 cP to about 15 cP, about 0.5 cP to about 20 cP, about 0.5 cP to about 30 cP, about 0.5 cP to about 40 cP, about 1 cP to about 5 cP, about 1 cP to about 10 cP, about 1 cP to about 15 cP, about 1 cP to about 20 cP, about 1 cP to about 30 cP, about 1 cP to about 40 cP, about 5 cP to about 10 cP, about 5 cP to about 15 cP, about 5 cP to about 20 cP, about 5 cP to about 30 cP, about 5 cP to about 40 cP, about 10 cP to about 15 cP, about 10 cP to about 20 cP, about 10 cP to about 30 cP, about 10 cP to about 40 cP, about 15 cP to about 20 cP, about 15 cP to about 30 cP, about 15 cP to about 40 cP, about 20 cP to about 30 cP, about 20 cP to about 40 cP, or about 30 cP to about 40 cP. The threshold viscosity or viscosity level may range between about 0.1 cP, about 0.2 cP, about 0.3 cP, about 0.4 cP, about 0.5 cP, about 1 cP, about cP, about 10 cP, about 15 cP, about 20 cP, about 30 cP, or about 40 cP.

A feedback mechanism may respond to the detection of errors in the sample extraction process. For example, a feedback mechanism may halt aspiration after identification of an error. An error may be a failure to load a new pipette tip and/or an obstruction in the pipette tip due to a damaged pipette tip, a blocked pipette tip, and/or a clogged pipette tip. Exemplary detection mechanisms include continuous pressure and/or flow rate monitoring and a sensor that detects the correct loading of a pipette tip.

In some examples, the first sample and the second sample are derived from blood. The first sample and the second sample may be held within a same container (e.g., a test tube or a well). The blood may be whole blood. The whole blood may be a fractionated blood sample. Blood fractionation is the process of fractionating (separating) whole blood into its individual components, which is typically done by subjecting the whole blood sample to centrifugation. These individual components can comprise serum, plasma, a buffy coat, and erythrocytes, as described elsewhere herein. Additional components may include platelets, platelet-rich plasma, exosomes, and/or circulating tumor cells. Each individual component of a fractionated blood sample has a different viscosity that may be detected, by the sensor(s) of the sample extraction device provided herein. For example, the sample extraction device may be directed into a container comprising a fractionated blood sample comprising a first sample (e.g., plasma) and a second sample (e.g., a buffy coat). The sample extraction device may detect a first viscosity of a first sample that may be most proximal to the pipette tip (e.g., plasma) while simultaneously aspirating the first sample. Next, the sample extraction device may detect a change in viscosity (i.e., a second viscosity of a second sample) once the second sample (e.g., the buffy coat) begins to be aspirated.

The whole blood may be subjected to ultracentrifugation, differential centrifugation, isopycnic centrifugation, density gradient centrifugation, ethanol fractionation, and/or rate-zonal centrifugation prior to directing a pipette of the sample extraction device into a container comprising a plurality of samples, wherein the plurality of samples comprises a first sample and a second sample. The first sample and the second sample may be individual components of a fractionated blood sample. For example, the first sample fluid may include plasma and the second sample may include a buffy coat. The first sample may include blood fractions, serum, plasma, platelet-rich plasma, a buffy coat layer, erythrocytes, platelets, exosomes, or circulating tumor cells. The second sample may include blood fractions, serum, plasma, platelet-rich plasma, a huffy coat layer, erythrocytes, platelets, exosomes, or circulating tumor cells. Furthermore, the plurality of samples may comprise a third sample. The third sample may be yet an additional, individual component of a fractionated blood sample. The third sample may include blood fractions, serum, plasma, platelet-rich plasma, a buffy coat layer, erythrocytes, platelets, exosomes, or circulating tumor cells.

FIG. 1 shows an example method for sample extraction 100. In a first operation 102, a sample extraction device may be activated. The sample extraction device may comprise a pipette. The pipette may comprise an opening that is in fluid communication with a reservoir through at least one channel. The sample extraction device may comprise at least one sensor. The sensor may be in sensing communication with the channel or with the reservoir. The sensor may output one or more signals, which may be indicative of a viscosity. The sensor may detect a viscosity in the channel or in the reservoir. In a second operation 104, the pipette may be directed into a container comprising a plurality of samples. The plurality of samples may comprise a first sample and a second sample that may have different viscosities (e.g., a fractionated blood sample). In a third operation 106, the first sample may be subjected to flow front the container to the reservoir upon application of a pressure drop or a pressure differential. The first sample may be subjected to flow while the sensor outputs one or more signals indicative of viscosity in the channel or reservoir. In a fourth operation 108, a change in viscosity may be detected. The change in viscosity may be indicative of the second sample flowing from the container, through the opening, and towards the reservoir. In a fifth operation 110, the application of the pressure drop may be terminated based on the detected change in viscosity. The termination of the pressure drop may reduce a flow rate of the second sample traveling from the container, through the opening of the pipette, and towards the reservoir.

In some examples, the method comprises activating an array comprising one or more sample extraction devices. The array may be mounted on a single platform. The one or more sample extraction devices may be a plurality of sample extraction devices. The plurality of sample extraction devices of the array may be individually or separately controlled, and individually or separately actuated. The plurality of sample extraction devices of the array may work in parallel or in a synchronized manner. The array may comprise at least 1, 2, 3, 4, 5, 6, 7, 8, 9, 10, 12, 20, 24, 30, 40, 48, 50, 60, 70, 80, 90, 96, 100, 150, 200, 250, 300, 350, 384, 400, 500, 1536, or more sample extraction devices. In an example, the array comprises up to 384 sample extraction devices. The array may be linear, two-dimensional, or three-dimensional.

In some examples, a pipette is directed into a container and fluid comprising a first sample is subjected to flow from the container through an opening to a reservoir. A change in viscosity is detected in the fluid. Then, application of a pressure drop is terminated. This may advantageously be performed in the absence of visual inspection of the first sample or a second sample.

Such visual inspection may comprise use of a laser-based system or camera-based system. Operations 104, 106, 108, and 110 may be performed in the absence of a measurement of a height or volume of the first sample or the second sample contained in the container. Operations 104, 106, 108, and 110 may be performed in the absence of a chemical assay, a biochemical assay, or a molecular biology assay performed on the first sample and the second sample. However, in some cases, a chemical assay, biochemical assay, or a molecular biology assay may be performed on one or more samples in the container, such as prior to or after performing sample extraction.

Operations 104, 106, 108, and 110 tray be performed in the absence of a density centrifugation medium. Non-limiting examples of a density centrifugation medium include: high molecular weight sucrose polymers (e.g., Ficoll, Ficoll PM 70, Ficoll PM400), colloidal silica particles coated with polyvinylpyrrolidone (PVP) Percoll), and/or colloidal silica particles coated with silane (e.g., Percoll PLUS).

Prior to sample extraction, one or more samples in a container may be processed, such as subjected to fluid or solid separation, or an assay. The assay may be nucleic acid amplification, such as polymerase chain reaction (PCR) or reverse transcription PCR (RT-PCR). PCR may be performed with thermal cycling. Alternatively, PCR may be isothermal PCR.

The container may include reagents for processing, such as enzymes for nucleic acid amplification. Such reagents may include polymerization enzymes (e.g., polymerase), primers, and/or Devices for Sample Extraction In another aspect, the present disclosure provides a sample extraction device. The sample extraction device may comprise at least one container. The container may be configured to contain a plurality of samples. The plurality of samples may comprise a first sample and a second sample. The first sample and the second sample may have different viscosities that may be detected by the sample extraction device. The first sample and the second sample may be individual components of a fractionated blood sample. The first sample and the second sample may be present in a same container (e.g., a tube or a well) yet separated into distinct layers (e.g., a first layer corresponding to the first sample and a second layer corresponding to a second sample).

The sample extraction device may also include at least one pipette comprising a first opening located at a proximal end of the pipette, with respect to the user, in fluid communication with one or more reservoirs through at least one channel. The pipette may comprise a second opening located at a distal end of the pipette, with respect to the user, in fluid communication with one or more samples.

The sample extraction device may also include at least one sensor that is in sensing communication with the channel or reservoir. The sensor may output one or more signals indicative of viscosity in the channel or the reservoir. The sample extraction device may also comprise at least one fluid flow unit in fluid communication with the channel. The fluid flow unit may supply a pressure drop.

The sample extraction device may also comprise at least one actuator that is configured to direct the pipette into the container.

Furthermore, the sample extraction device may comprise one or more computer processors operatively coupled to the sensor and the fluid flow unit. The one or more computer processors may be a plurality of computer processors. The computer processor may be a component of a computer system.

The plurality of computer processors may be individually or collectively programmed to direct the actuator to direct the pipette into the container, which may comprise the plurality of samples. The plurality of computer processors may also be individually or collectively programmed to direct the fluid flow unit to subject the first sample to flow from the container, through the opening, to the reservoir upon application of a pressure drop. The first sample limy be subjected to flow while the sensor outputs the one or more signals indicative of the viscosity in the channel or the reservoir. The plurality of computer processors may also be individually or collectively programmed to use the sensor to detect a change in the viscosity. The change in viscosity may be indicative of the second sample flowing from the container, through the opening, and towards the reservoir. The plurality of computer processors may also be individually or collectively programmed to, upon detecting the change in viscosity, direct the fluid flow unit to terminate application of the pressure drop. Termination of the pressure drop may reduce the flow rate of the second sample from the container, through the opening, towards the reservoir.

The plurality of computer processors may be individually or collectively programmed to eject a small volume of the second sample after terminating application of the pressure drop. The plurality of computer processors may be individually or collectively programmed to terminate the flow rate of the second sample. The plurality of computer processors may be individually or collectively programmed to direct the first sample from the reservoir to a waste container after termination of the flow rate of the second sample. The plurality of computer processors may be individually or collectively programmed to direct the first sample from the reservoir to the additional container after termination of the flow rate of the second sample. The plurality of computer processors may be individually or collectively programmed to eject the pipette tip and load a new pipette tip after termination of the flow rate of the second sample. The plurality of computer processors may be individually or collectively programmed to direct the pipette comprising the new pipette tip to the container after termination of the flow rate of the second sample. The plurality of computer processors may be individually or collectively programmed to direct the pipette comprising the new pipette tip to a new container after terminating the flow rate of the second sample.

The different components of the extraction device such as, but not limited to, the container, the pipette, the reservoir, the channel, the fluid flow unit, the actuator, and/or the computer processor may be modular. For example, such components may be moved around freely and may allow for alternative configurations than the configurations disclosed in the disclosure. For example, the sample extraction device may exclude some of the components, such as a sensor. The extraction device comprising modular components may perform the same way and may generate the same results as an extraction device with fixed (i.e. non-modular) components.

Figure 2A:
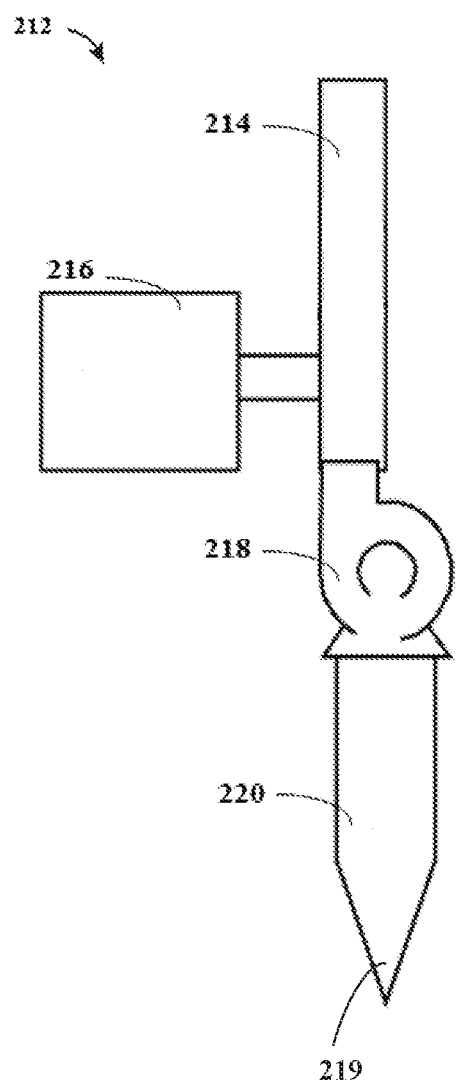
FIG. 2A shows an example sample extraction device

FIG. 2A shows an example of a sample extraction device 212. The sample extraction device comprises a channel 214, a sensor 216, a fluid flow unit 218 (e.g., a pump), a pipette 220, at least one container (not shown in FIG. 2A), an actuator (not shown in FIG. 2A), and one or more computer processors (not shown in FIG. 2A). The fluid flow unit 218 may be a pump. The fluid flow unit 218 may be disposed between the pipette 220 and the channel 214 or between the pipette 220 and the fluid flow unit 218.

The sample extraction device 212 may be used to extract a sample from a container, such as in the manner described above in the context of FIGS. 1 and 5. The sensor 216 may detect a change in viscosity of a fluid sample in the fluid channel 214. For example, the sensor 216 may detect a change in viscosity between a first blood component and a second blood component of a fractionated blood sample. Upon detection of such change, the sensor 216 may direct the fluid flow unit 218 to adjust (e.g., reduce or terminate) a flow rate of the fluid.

Channel

The sample extraction device 212 may comprise a channel 214. The channel 214 may be in fluid communication with the pipette 220, the fluid flow unit 218, the sensor 216, and the reservoir (not shown in NG. 2A). The channel 214 may comprise a proximal end and a distal end, with respect to the user. The proximal end of the channel 214 may be operatively connected to a reservoir. The distal end of the channel 214 may be operatively connected to the fluid flow unit 218. The sensor 216 may be operatively connected to the channel 214 at any location between the proximal end and the distal end of the channel 214. The sensor 216 may detect a change in viscosity of a liquid sample in the channel 214. The channel 214 may be used to transport a sample from a container to the reservoir or vice-versa, from the reservoir to a container. The channel 214 may comprise a hydrophobic surface to repel liquids and minimize sample loss.

Sensor if present, the sensor 216 may be in fluid connection with the channel 214 or a reservoir (not shown in FIG. 2A). One or more other sensors may be used in addition to the sensor 216. The sensor 216 may be a viscosity sensor, a pressure sensor, an electromechanical force sensor, a voltage sensor, a piezoelectric sensor, a piezoresistive sensor, a surface tension sensor, and/or a magnetic sensor. Thus, the sensor may detect viscosity, pressure, voltage, surface tension, resistance, temperature, and/or a magnetic field. The sensor may be a pressure sensor. The sensor may be a flow rate sensor. The sensor 216 may be placed inside the channel 214. A plurality of sensors 216 may be in fluid connection with the channel 214 or the reservoir and may simultaneously detect different parameters. The sample extraction device may comprise two sensors. The sample extraction device may comprise at least 1, 2, 3, 4, 5, 6, 7, 8, 9, 10, or more sensors. The sample extraction device may have one or more sensors at or adjacent to a constriction. A given sensor may be at the constriction in sensing proximity to the constriction. The sensor may be a viscosity sensor, a pressure sensor, an electromechanical force sensor, a voltage sensor, a piezoelectric sensor, a piezoresistive sensor, a surf ace tension sensor, and/or a magnetic sensor.

The sensor 216 may be used to measure a flow rate. The sensor 216 may be used to measure a flow rate of a sample. The sensor 216 may be used to measure a flow rate of a liquid or a gas. The sensor 216 may be a flow meter. The sensor 216 may be a flow sensor such as, but not limited to, a miniaturized flow sensor, a MEMS-flow sensor, or a differential pressure flow sensor.

In some cases, the sensor 216 is precluded. In such cases, stable flow characteristics may be sufficient to implement fluid extraction and sensor measurements may not be needed. For example, fluid is extracted for a pre-set time period based on previous measurements of such fluid. Upon the pre-set time period being reached, the flow of the fluid may be terminated. This may be implemented without sensor measurements. The pre-set time period may correspond to a point at which the fluid undergoes a change in fluid viscosity.

Figure 2B:
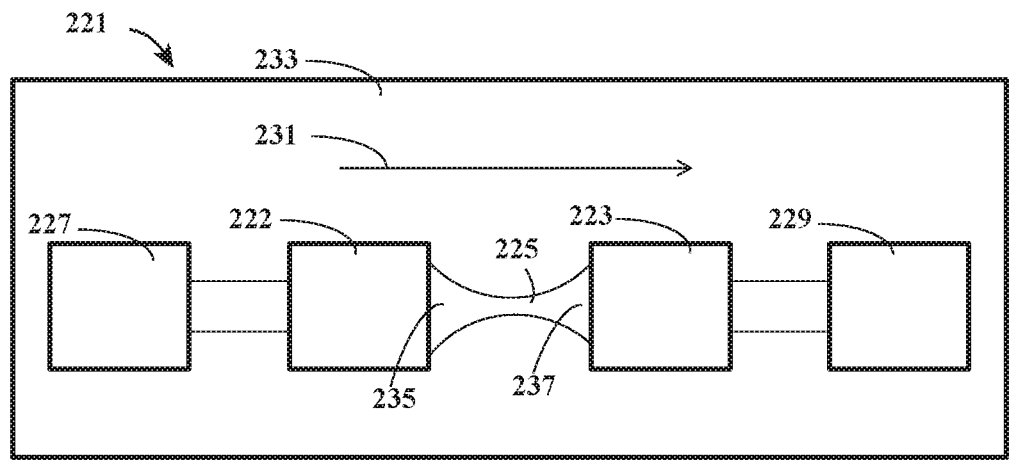
FIG. 2B illustrates an example of a flow sensor schematic.

FIG. 2B shows a schematic diagram representing a Micro-Electro Mechanical Systems (MEMS) flow sensor 221. While the flow sensor 221 is a MEMS flow sensor, other types of sensors may be used. The sample extraction device 212 may comprise the MEMS flow sensor 221. The MEMS flow sensor 221 may measure the pressure difference across an integrated fluidic restriction. The flow sensor may comprise a first piezo-resistive pressure sensor 222 and a second piezo-resistive pressure sensor 223 that are connected by a micro-channel 225. For example, fluid may enter through an inlet port 227, then flow through the first piezo-resistive pressure sensor 222, then flow through the micro-channel 225, then flow through the second piezo-resistive pressure sensor 223, and exit through the outlet port 229. The direction of fluid flow is represented by the arrow 231. The micro-channel 225 may comprise a first end 235 that is operatively connected to the first piezo-resistive pressure sensor 222 and a second end 237 that is in operatively connected to the second piezo-resistive pressure sensor 223. The first piezo-resistive pressure sensor 222 and the second piezo-resistive pressure sensor 223 may be mounted onto a silicon chip 233 in order to form the actual flow sensor device. The MEMS flow sensor 221 may comprise bonded silicon and glass wafers with through-holes for fluidic connection. The MEMS flow sensor 221 may detect signals corresponding to various fluid properties, such as, but not limited to, inlet and outlet pressure and/or fluid temperature. The first piezo-resistive pressure sensor 222 may detect an inlet pressure at the first end 235 of the micro-channel 225. The second piezo-resistive pressure sensor 223 may detect an outlet pressure at the second end 237 of the micro-channel 225. Volumetric flow rate is a linear function of the pressure difference between the first end 235 and the second end 237 of the micro-channel 225. Volumetric flow rate depends only on the restriction geometry of the micro-channel 225 and of the fluid dynamic viscosity of the sample flowing through the micro-channel 225. Thus, the flow rate may be calculated based on the inlet pressure and the outlet pressure detected at the first end 235 and second end 237, respectively, of the micro-channel 225. The flow sensor may compensate for temperature effects by monitoring temperature of the sample with a temperature sensor (not shown in FIG. 2B). The flow sensor may also compensate for viscosity by adjusting the viscosity value based on the measured temperature value of the sample.

The sensor 216 may be used to measure a pressure. The sensor 216 may be a pressure transducer. The sensor 216 may be a MEMS-scale pressure transducer. For example, the sensor 220 may convert a force indirectly into an electrical signal. The force being sensed deforms a strain gauge via a mechanical arrangement. The strain gauge then converts the deformation (strain) to an electrical signal. The electrical signal may be calibrated and may be used to calculate a force, a mass, and/or a weight. The sensor 216 may detect or monitor the pressure in the air space between a fluid flow unit and a sample.

Fluid Flow Unit

The pipette 220 may be operatively connected to the fluid flow unit 216. For example, FIG. 2A shows the proximal end of the fluid flow unit 218 operatively connected to the distal end of the channel 214. In addition, FIG. 2A shows the distal end of the fluid flow unit 218 operatively connected with the proximal end of the pipette 220. The fluid flow unit 218 may comprise a pump or a plurality of pumps that supply a pressure drop. The pump may be a piston pump, a vacuum pump, an air pump, a diaphragm pump, a gear pump, a peristaltic pump, piezoelectric micropump, an electrostatic micropump, a thermo-pneumatic micropump, a pneumatic micropump, or a magnetic micropump. The pump may be a micropump. The pump may comprise a motor (not shown in FIG. 2A) that actuates the pump. For example, the motor may actuate a pressure drop, a motion of a plunger, or an air supply. The motor may be controlled by a computer system. The pump may comprise a piezoelectric actuator that controls sample dispensing and aspirating.

Pipette lie sample extraction device 212 may comprise a pipette 220 or a plurality of pipettes. The pipette 220 may serve as a conduit to transport a sample from the container to a reservoir or to another container or from a reservoir to a container. The pipette may comprise a proximal end and a distal end, with respect to the user. In other words, the proximal end may be the end that is closest to the user, and the distal may be the end that is farthest from the user. The distal end of the pipette may comprise a pipette tip 219, as shown in FIG. 2A. The pipette tip 219 may comprise an opening or an inlet, which may be in fluid communication with a sample. The proximal end of the pipette may be operatively connected with the pump 218. The proximal end of the pipette 220 may be operatively connected with the pump 218. The proximal end of the pipette 220 may be operatively connected with the fluid channel 214. The pipette 220 may be in fluid communication with the sensor 216. The sample extraction device may comprise a pipette tip ejector that ejects the pipette tip that is coupled to the pipette. The pipette may be dimensioned to extract a fluid volume of at least about 0.5 µl, 2 µl, 5 µl, 10 µl, 20 µl, 50 µl, 100 µl, 200 µl, 500 µl, 1000 µl, 5000 µl, or more. The pipette may be dimensioned to extract a fluid volume of up to 10 int. The sample extraction device may comprise a plurality of pipettes. The plurality of pipettes may be individually addressable. The plurality of pipettes may be individually controlled and individually actuated. The plurality of pipettes may be a multi-channel pipetting head.

The pipette 220 may be a syringe, a motorized syringe, a micro-syringe, a nozzle, a transfer pipette, an adjustable pipette, a volumetric pipette, an air displacement micropipette, a positive displacement pipette, a Pasteur pipette, a graduated pipette, a pipetting syringe, a Van Slyke pipette, an Ostwald-Folin pipette, a glass micropipette, a microfluidic pipette, a robotic pipette, an electronic pipette, a motorized pipette, a zeptoliter pipette, a nanoliter pipette, a microliter pipette, or a milliliter pipette. The pipette 220 may be a plurality of pipettes. The pipette 220 may be a multi-channel pipetting head. The pipette 220 may be a glass pipette, a metal pipette, or a plastic pipette.

The pipette 220 may comprise a pipette tip that is configured to reversibly connect with the pipette 220. The pipette tip may comprise a tubular shape, a proximal opening at its base end that is configured to befitted into the pipette 220, and a distal opening at its tip end that is configured to be in contact with a sample. The pipette tip may be a filtered pipette tip or a non-filtered pipette tip. The filtered pipette tip may comprise a hydrophobic plastic filter, such as a polyethylene filter, that helps prevent sample and aerosol contamination. The pipette tip may be a sterile pipette tip or a non-sterile pipette tip. The pipette tip may be an autoclavable pipette tip. The pipette tip may comprise a clip, a pipette tip fitting flange and a sealing ring that provide with an interlocking technology to lock the pipette tip into place upon fitting into the pipette 220. The pipette tip may also comprise a snap, a pipette tip fitting groove, and a lip seal that provide a "snap and seal" mechanism to securely attach the pipette tip to the pipette 220. The pipette tip may range in length from about at least 20 mm to about 120 mm. The length of the pipette tip may be at least 30 mm, 40 mm, 50 mm, 60 mm, 70 mm, 80 mm, 90 mm, 100 mm, 110 mm, or more. The pipette tip may be a gel loading pipette tip that allows for loading and transporting viscous samples. The pipette tip may comprise a hydrophobic and/or ultra-smooth inner surface to minimize sample retention and enable maximum sample recovery.

Container

The sample extraction device may comprise at least one, two, three, four, five, six, seven, eight, nine, ten or more containers. The container and any additional containers may comprise a label or a barcode. The barcode may be a QR code, a data matrix, an EZcode, a Microsoft tag, a code 39 barcode, or a codeabar barcode. The sample extraction device may comprise a barcode reader that identifies and tracks the container and/or any additional containers. As an alternative, the sample extraction device includes a radiofrequency identification (RFID) unit, memory, or chip for identifying and/or tracking the container or any additional containers. The RED, memory, or chip may include a communications interface for permitting communication to or from a reader.

The container may be a barcoded container or a container that is otherwise labeled with an identifiable label such as, but not limited to a RFD unit, a memory, or a chip. The container may be a glass, plastic, or metal container. The container may be a polystyrene container, a polycarbonate, or a polyethylene container. The container may be a tube, a test tube, a vacutainer tube, a serum-separating tube, a well plate, a specimen collection container, a beaker, a flask, a cylinder, a bottle, a jar, a specimen container, a leak resistant container, or a cell counter cup. The well plate may be a cell culture plate, a polymerase chain reaction (PCR) welt plate, a microplate, or a storage plate. The well plate may be a barcoded plate. The well plate may be a 6, 12, 24, 48, 96, or a 384 well plate. The container may comprise a cap, a cap strip, an adhesive seal, a self-closing seal, an adhesive film, a cover, or a rubber stopper. The container may be a color-labeled container to indicate the type of sample it contains. The container may comprise an additive such as, but not limited to, a clot activator, di-potassium ethylene diamine-tetracetate, lithium heparin, sodium citrate, sodium fluoride, potassium oxalate, and/or a serum gel separator.

Actuator

The sample extraction device 212 may comprise an actuator or a plurality of actuators (not shown in FIG. 2A). The actuator may be a hydraulic actuator, a mechanical actuator, an electric actuator, a pneumatic actuator, a thermal actuator, a magnetic actuator, a soft actuator, a robot actuator, and/or a microactuator. The actuator may be a motor (e.g., a step motor) or a multi-axis manipulator. The actuator may direct the movement of the pipette 220 in the x-, y-, and z-directions. For example, the actuator may direct the pipette 220 into a container. The actuator may direct the movement of the pipette 220 by directing the movement of a manipulation unit that is operatively connected to the pipette 220.

Manipulation Unit

The sample extraction device may comprise a manipulation unit operatively connected to the pipette. The manipulation unit may displace the pipette in an x-direction, a y-direction and a z-direction. The manipulation unit may be a robotic motion platform, a robotic arm, and/or a gantry. The gantry may comprise sliding rails along an x-direction, a y-direction, and/or a z-direction. The gantry may comprise up to three degrees of translational freedom. The gantry may comprise three axes of belt-driven slides actuated by a stepper motor, for example. The gantry slides may be mounted on a metal or metal alloy framework. Slides aligned in the x- and y-directions may facilitate motion of the sample extraction device into and out of containers. The z-axis of the gantry may be associated with an additional actuator, which may be configured to direct the extent of vertical motion of the sample extraction device during pipette pick-up and sample extraction and/or dispensing operations.

Sample Extraction Device Arrays

Figure 3:
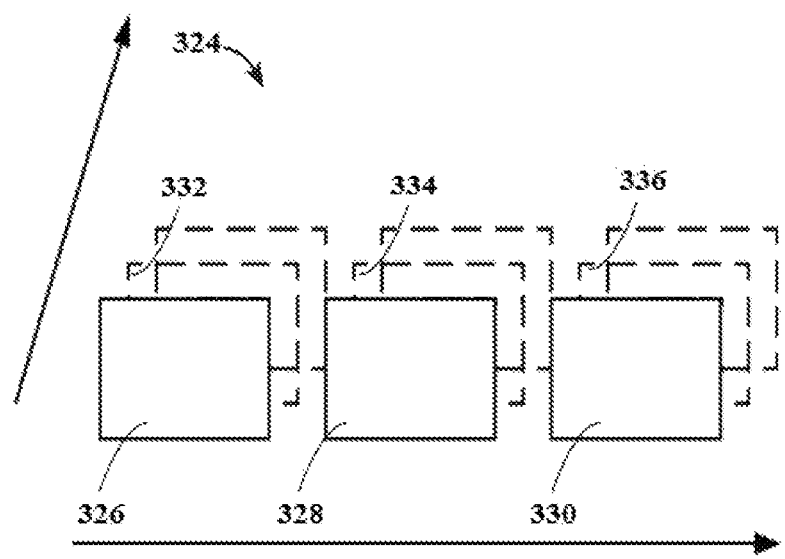

As shown in FIG. 3, a plurality of sample extraction devices may be organized hi a two-dimensional array comprising an x-direction and a y-direction (as shown by the two arrows in FIG. 3). FIG. 3 shows an array of sample extraction devices 324. The array of sample extraction devices 324 may comprise a first sample extraction device 326, a second extraction device 326, a third sample extraction device 3:30, a fourth extraction device 332, a fifth sample extraction device 334, and a sixth extraction device 336. The array may comprise at least 1, 2, 3, 4, 5, 6, 7, 8, 9, 10, 12, 20, 24, 30, 40, 48, 50, 60, 70, 80, 90, 96, 100, 1.50, 200, 250, 300, 350, 384, 400, 500, 1536, or more sample extraction devices. The array of sample extraction devices 324 may be single dimensional, a two-dimensional, or a three-dimensional array. In an example, the array may comprise up to 384 sample extraction devices. In an example, the array may comprise up to 96 sample extraction devices, in an example, the array may comprise up to 24 sample extraction devices. The array may be a linear array. In an example, the linear array may comprise up to 8 sample extraction devices. The array of sample extraction devices 324 may be individually controlled and individually actuated. The array of sample extraction devices 324 may comprise sample extraction devices that work in parallel or work in a synchronized manner. Each sample extraction device of the array of sample extraction devices 324 may be logically switched on and off and may be directed to a plurality of containers, each of which may comprise a sample. The containers may comprise samples of varying heights, samples comprising varying fraction to total volume ratios, and samples comprising varying height interfaces. The array of sample extraction devices 324 may comprise a single platform upon which each sample extraction device is mounted on. Alternatively, a plurality of sample extraction devices may not be organized in an array. For example, the plurality of sample extraction devices may not comprise rows and columns, or may not be organized in a particular arrangement.

Computer Systems

Figure 4:
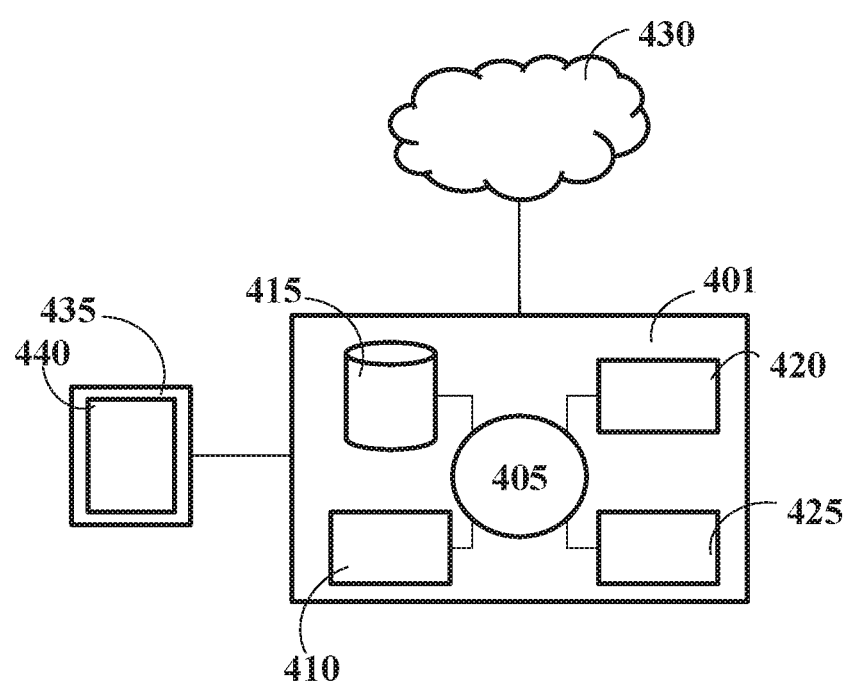
FIG. 4 shows a computer system that is programmed or otherwise configured to implement the methods provided herein.

The present disclosure provides computer systems that are programmed to implement methods of the disclosure. FIG. 4 shows a computer system 401 that is programmed or otherwise configured to direct the extraction of a sample. The computer system 401 can regulate various aspects of sample extraction of the present disclosure, such as, for example, activating a sample extraction device. The computer system 401 can subject a first sample to flow from a container to a reservoir upon application of a pressure drop. The computer system 401 can direct a sensor to detect a change in viscosity that may be indicative of a different sample. The computer system 401 can terminate the application of a pressure drop and thus, reduce the flow rate of a sample. The computer system 401 can be an electronic device of a user or a computer system that is remotely located with respect to the electronic device. The electronic device can be a mobile electronic device.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid such as a motherboard. The storage unit 415 can be a data storage unit (or data repository) for storing data. The computer system 401 can be operatively coupled to a computer network. ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a sewer.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user. Examples of remote computer systems include personal computers (e.g., portable PC), slate or tablet PC's (e.g., Apple® iPad, Samsung® Galaxy Tab), telephones. Smart phones (e.g., Apple® iPhone, Android enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory-, flash memory) or a hard disk. "Storage" type media can include any or all of the tangible: memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waxes, such as wired of wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission mediums. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (JR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier are transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for providing, for example, sample tracking, which indicates an amount of sample dispensed, aspirated, or transferred; an error due to sample clogging; and/or an error due to insufficient volume present in the container. The UI 568 may also provide a protocol or a plurality of protocols that direct the sample extraction methods. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, direct the extraction of a sample in response to a change in a detected viscosity.

EXAMPLES

Figure 5:
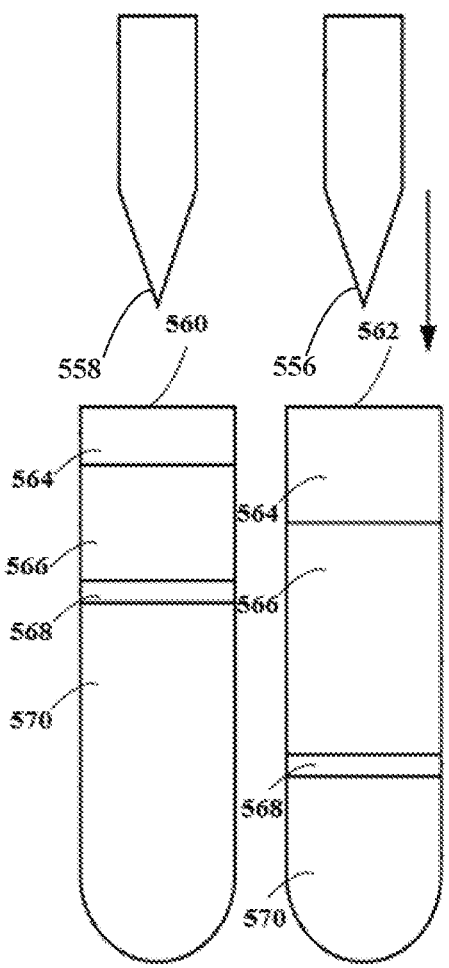
FIG. 5 show s exemplar, extractions of blood fractions from two containers comprising fractionated blood samples, using the sample extraction devices disclosed herein.

Example 1—Extraction of Plasma and Buffy Coat Samples Using a Two-Dimensional Array of Sample Extraction Devices FIG. 5 shows an exemplary linear array of sample extraction devices comprising a first pipette tip 556 and a second pipette tip 558 (remaining components of the first and second sample extraction devices are not shown in FIG. 5). FIG. 5 also shows a first container 560 and a second container 562. The motion of the first pipette tip 556 and the second pipette tip 558, once the sample extraction devices are activated, is indicated by the arrow in FIG. 5 (i.e., the tips move into the first container 560 and the second container 562). The first pipette tip 556 and the second pipette tip 558 may move independently or altogether, depending on the mounting strategy. For example, the mounting strategy may be a two-dimensional head (i.e., array) or a one-dimensional span individual channel technology. The first container 560 and the second container 562 comprise a first sample 564, a second sample 566, a third sample 568, and a fourth sample 570. The first container 560 and the second container 562 comprise whole blood that has been subjected to ultracentrifugation. Centrifugation of whole blood samples is used to separate the various components of blood plasma, (i.e., blood fractionation). Blood fractionation separates whole blood into its three primary components, which include blood plasma, a mixture of leukocytes (white blood cells) and platelets called a buffy coat, and erythrocytes or red blood cells. As shown in FIG. 5, the first sample 564 is air, the second sample 566 is plasma, the third sample 568 is a buffy coat, and the fourth sample 570 is red blood cells. The first sample 564, the second sample 566, the third sample 568, and the fourth sample 570 all have different viscosities that are able to be detected by the sensors of the sample extraction devices described herein.

In this example, the sample extraction devices extract a second sample 566 (e.g. plasma) from a container and dispense it into a new, clean container. At the beginning of the process, the sample extraction device loads a new, sterile first pipette tip 556 and a new, sterile second pipette tip 558. The sample extraction devices lowers the first pipette tip 556 and the second pipette tip 558 until they reach the height of the first container 560 and the second container 562. The sample extraction devices starts aspirating air (i.e. the first sample 564) through the first pipette tip 556 and through the second pipette tip 558 while both pipette tips are lowered into the containers. The flow rate of each sample extraction device is continuously monitored. When the first pipette tip 556 reaches the air/plasma (i.e. the first sample/second sample) interface, the flow rate of the first sample extraction device is rapidly decreased, indicating the extraction of the second sample 566 (e.g. plasma) vs. the extraction of the first sample 564 (e.g. air). Likewise, the same decrease in flow rate occurs when the second pipette tip 558 reaches the air/plasma (i.e. the first sample/second sample) interface.

The sample extraction devices continues the aspiration of the samples as the first pipette tip 556 and the second pipette tip 558 continues to be lowered into the first container 560 and the second container 562, respectively. When the first pipette tip 556 reaches the plasma/buffy coat layer (i.e. the second sample/third sample) interface, the flow rate of the first sample extraction device rapidly decreases, indicating the extraction of the third sample 568 (e.g. buffy coat) vs. the extraction of the second sample 566 (e.g. plasma). Likewise, the same decrease in flow rate occurs when the second pipette tip 558 reaches the plasma/buffy coat (i.e. the second sample/third sample) interface. The difference in flow rate and thus, the difference in viscosities of the second sample 566 and the third sample 568 triggers the sample extraction devices to stop the aspiration processes in order to retain the plasma within the pipette tips. The pipettes are directed to move back up and to discard a small volume (e.g. at least 0.5 µl, 1 µl, 5 µl, 10 µl, or more) in order to ensure only plasma is retained within the pipette tips. The pipettes are moved into clean containers and the plasma samples are ejected into the clean containers. The used pipette tips are automatically discarded.

The manipulation unit of the first sample extraction device moves the first pipette tip 556 into the first container 560, exactly at the level where the buffy coat (i.e. the third sample 568) was registered in the first container 560 during the initial aspiration. The first pipette tip 556 aspirates the buffy coat sample. The manipulation unit moves the second pipette tip 558 at the level where the buffy coat was registered in the second container during the initial aspiration. The buffy coat in each pipette tip is dispensed in new, clean containers (different from those containers comprising the extracted plasma samples). The used pipette tips are automatically discarded.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set to herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for sample extraction, comprising:
   (a) activating a sample extraction device comprising: (i) a pipette comprising an opening in fluid communication with a reservoir through at least one channel, and (ii) at least one sensor in communication with said at least one channel or said reservoir, wherein said at least one sensor outputs one or more signals indicative of a viscosity in said at least one channel or said reservoir;
   (b) directing said pipette into a container comprising a plurality of samples, wherein said plurality of samples comprises a first sample and a second sample, and wherein said first sample and said second sample have different viscosities;
   (c) subjecting said first sample to flow from said container through said opening of said pipette to said reservoir upon application of a pressure drop, wherein said first sample is subjected to flow while said at least one sensor outputs said one or more signals indicative of said viscosity in said at least one channel or said reservoir;
   (d) detecting a change in said viscosity in said at least one channel or said reservoir, wherein said change is indicative of said second sample flowing from said container through said opening of said pipette towards said reservoir; and
   (e) upon detecting said change in (d), terminating said application of said pressure drop, thereby reducing a flow rate of said second sample from said container through said opening of said pipette towards said reservoir.

2. The method of claim 1, wherein said pipette is configured to extract a fluid volume of up to 10 millimeters (mL).

3. The method of claim 1, wherein (e) comprises ejecting a volume of said second sample after terminating said application of said pressure drop.

4. The method of claim 1, wherein (e) comprises terminating said flow rate of said second sample.

5. The method of claim 4, wherein (e) comprises ejecting a tip from said pipette and loading a new tip on said pipette after terminating said flow rate of said second sample.

6. The method of claim 1, wherein said pressure drop is not sufficient to subject said second sample to flow from said container through said opening towards said reservoir.

7. The method of claim 1, wherein said change in said viscosity in said at least one channel or said reservoir is detected with reference to a threshold viscosity.

8. The method of claim 7, wherein said threshold viscosity is from 0.1 centipose (cP) to 20 cP.

9. The method of claim 1, further comprising activating an array comprising one or more sample extraction devices.

10. The method of claim 1, wherein (b)-(e) are performed in an absence of a density centrifugation medium.

* * * * *

UNITED STATES PATENT AND TRADEMARK OFFICE
CERTIFICATE OF CORRECTION

PATENT NO. : 11,781,959 B2
APPLICATION NO. : 16/827439
DATED : October 10, 2023
INVENTOR(S) : Daniel Delubac It is certified that error appears in the above-identified patent and that said Letters Patent is hereby corrected as shown below:

In the Claims

Claim 2, Line 2:
Replace "ured to extract a fluid volume of up to 10 millimeters (mL)." with --ured to extract a fluid volume of up to 10 milliliters (mL).--.

Claim 8, Line 2:
Replace "is from 0.1 centipose (cP) to 20 cP." with --is from 0.1 centipoise (cP) to 20 cP.--.

Signed and Sealed this
Sixteenth Day of April, 2024

Katherine Kelly Vidal
*Director of the United States Patent and Trademark Office*